United States Patent Office 2,818,424
Patented Dec. 31, 1957

2,818,424

ESTERS OF HALOGENATED PHENOXY ACETIC ACIDS AND α-HYDROXYALIPHATIC ACIDS

Karl Zeile, Wilhelm Konz, and Richard Sehring, Ingelheim, Germany, assignors to C. H. Boehringer Sohn, Ingelheim am Rhine, Germany, a partnership of Germany consisting of Albert Boehringer, Ernst Boehringer, Ilse Liebrecht, born Boehringer, and Julius Liebrecht No Drawing. Application September 19, 1955
Serial No. 535,258

Claims priority, application Germany September 20, 1954

8 Claims. (Cl. 260—473)

This invention relates to new and valuable esters of halogenated phenoxy acetic acids and more particularly to esters of halogenated phenoxy acetic acids with lower aliphatic α-hydroxy carboxylic acids and their esters, and to a process of making same.

Esters of halogenated phenoxy acetic acids with alcohols, such as methanol, ethanol, propanol, butanol, or amyl alcohol are known. It is also known that such esters possess herbicidal properties. However, these known esters have the disadvantage that they are rather volatile and that their herbicidal activity is frequently of insufficient duration.

One of the objects of the invention is to provide esters of halogenated phenoxy acetic acids having high herbicidal activity, lower volatility and longer duration of activity than the known esters of halogenated phenoxy acetic acids.

Another object of the invention is to provide new and valuable esters of halogenated phenoxy acetic acids which are superior to the known esters of said acids with alcohols because of their low volatility and their prolonged herbicidal activity.

Another object of the present invention is to provide a simple and effective process for producing said new acids of halogenated phenoxy acetic acids.

Still another object of the present invention is to provide effective herbicidal preparations containing, as active herbicidal ingredients, said new esters of halogenated phenoxy acetic acids.

Other objects and advantages of the invention will become apparent as this description proceeds.

The new esters of halogenated phenoxy acetic acids according to the present invention are esters formed with lower aliphatic α-hydroxy carboxylic acids or their esters and correspond to the following Formula I:

FORMULA I

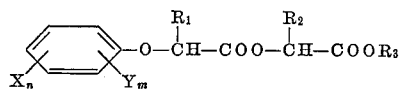

In said formula:

X indicates halogen,
$n$ indicates an integer between 1 and 5,
Y indicates methyl,
$m$ indicates the integers 0 or 1,
$R_1$ and $R_2$ indicate hydrogen, methyl, or ethyl, and $R_3$ indicates hydrogen, an alkyl radical with 1–8 carbon atoms, or the residue of a mono- or poly-alkylene glycol which can be etherified on one of the hydroxy groups, the alkylene groups of this glycol having up to 8 carbon atoms, such as groups of the formulas —CH$_2$—CH$_2$—O—CH$_3$
—CH$_2$—CH$_2$—O—CH$_2$—CH$_3$
—CH$_2$—CH$_2$—O—CH$_2$—CH$_2$—O—CH$_2$—CH$_2$—OH Said new esters are produced according to the present invention by esterifying a halogenated phenoxy acetic acid of the Formula II.

FORMULA II

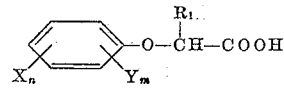

wherein

X, Y and $R_1$ are the same substituents and $n$ and $m$ are the same integers as indicated above, or a functional derivative of said acids, such as an ester or a chloride or a bromide thereof, with an hydroxy carboxylic acid and its esters of the Formula III.

FORMULA III

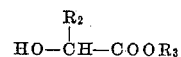

wherein $R_2$ and $R_3$ are the same substituents as indicated above, thereby forming the esters of the Formula I with consequent release of water.

It is, of course, also possible to produce the new esters, according to the present invention, by reacting the chloride, bromide or other halogenide of a halogenated phenoxy acetic acid, of the above given formula, with the disodium salt of a monohydroxy monocarboxylic acid of the above given Formula III, or with the monosodium salt of a monohydroxy monocarboxylic acid ester of said Formula III. Other dialkali metal salts or mono-alkali metal salts can equally be used.

If desired, the resulting halogenated phenoxy acetic acid ester, wherein $R_3$ indicates hydrogen, can subsequently be esterified with an alkanol such as methanol or ethanol, or with Cellosolve or Carbitol, etc., so as to introduce the $R_3$-group, $R_3$ being the same substituents as indicated above, except hydrogen.

The esterification is preferably carried out in an inert solvent such as toluene, benzene or xylene and at temperatures between about room temperature and about the boiling point of the solvent used. It is of advantage to add an esterification catalyst, such as p-toluene sulfonic acid, sulfuric acid, or phosphoric acid to the esterification mixture.

The water set free by the reaction of the halogenated phenoxy acetic acid with the α-hydroxy carboxylic acid ester is preferably simultaneously removed by azeotropic distillation with the solvent. Esterification is discontinued as soon as 1 mol of water is split off. Yields of about 90% of the theoretical are thereby obtained. It is quite surprising that the ester group of the hydroxy carboxylic acid remains substantially unaffected under the conditions of esterification, as is evident from the high yields obtained.

The new compounds according to the present invention can be used as weed controlling agents in the form of emulsions or suspensions, or in other forms.

An emulsion can be prepared, for instance, by emulsifying 70 gm. of a herbicidal ester, produced as described in the following examples, and 30 gm. of naphthalene sulfonate in such an amount of water that the emulsion contains 0.1% to 0.2% of said herbicidal ester. The emulsifying agent is preferably present in such an emulsion in an amount between 0.04% and 0.1%.

A suspension can be prepared, for instance, by suspending 70 gm. of a herbicidal ester, produced as described herein, with 5 gm. of a wetting agent and 25 gm. of kaolin, or another suitable solid carrier, in such an amount of water that the suspension contains 0.1% to 0.2% of said herbicidal ester. The wetting agent and the solid carrier are preferably added to such suspensions in amounts between 0.02% and 0.1% for the wetting agent or, respectively, between 0.1% to 0.2% for the solid carrier.

The following examples serve to illustrate the present invention without, however, limiting the same thereto.

Example I 255 gm. of 2,4,5-trichloro phenoxy acetic acid, 200 gm. of lactic acid ethyl ester, and 2 gm. of p-toluene sulfonic acid are boiled under reflux in 1000 cc. of toluene for 5 hours. The water split off thereby is continuously removed by azeotropic distillation. The amount of water removed in this manner is 18 gm. Thereafter, toluene and excess of lactic acid ethyl ester are distilled off in a vacuum. The remaining 2,4,5-trichloro phenoxy acetyl lactic acid ethyl ester can be distilled in a vacuum for purification. Its boiling point is 175–180° C./0.2 mm. The yield amounts to 90% of the theoretical yield.

Example II 127.7 gm. of 2,4,5-trichloro phenoxy acetic acid, 132 gm. of glycolic acid butyl ester and 1 gm. of p-toluene sulfonic acid are boiled under reflux in 500 cc. of toluene for 5 hours. The water split off thereby is continuously removed by azeotropic distillation. The amount of water removed in this manner is 9 gm. Thereafter, the toluene and the excess of glycolic acid butyl ester are distilled off in a vacuum. The remaining 2,4,5-trichloro phenoxy acetyl glycolic acid butyl ester is obtained in a yield of 90% of the theoretical yield. Its boiling point is 172–174° C./0.2 mm.

Example III 110 gm. of 2,4-dichloro phenoxy acetic acid, 118 gm. of lactic acid ethyl ester and 1 gm. of p-toluene sulfonic acid are boiled under reflux in 500 cc. of toluene for 5 hours. The reaction mixture is worked up as described in Example II. 2,4-dichloro phenoxy acetyl lactic acid ethyl ester is obtained in this manner in a yield of 90% of the theoretical yield. Its boiling point is 170–180° C./0.5–1.0 mm.

Example IV 122 gm. of the disodium salt of lactic acid are suspended in 1000 cc. of toluene. 274 gm. of 2,4,5-trichloro phenoxy acetyl chloride are added thereto while cooling. The precipitate is filtered off, dried, washed with water, acidified with dilute hydrochloric acid, filtered by suction, and recrystallized from ethanol. 290 gm. of 2,4,5-trichloro phenoxy acetyl lactic acid of the melting point 138° C. are obtained.

Example V 200 gm. of 2,4,5-trichloro-phenoxy acetic acid and 180 gm. of lactic acid amyl ester are heated to 170° C. with stirring; simultaneously air is bubbled through the reaction mixture. The water split off thereby is continuously distilled off. After 7 hours of reaction, the excess of lactic acid amyl ester is separated in vacuo. 309 gm. (97% of the theory) 2,4,5-trichloro-phenoxy acetyl lactic acid amyl ester are obtained. The ester cannot be distilled.

In place of 2,4,5-trichloro phenoxy acetic acid and 2,4-dichloro phenoxy acetic acid used in Examples I to III, there can be employed equimolecular amounts of other halogenated phenoxy acetic acids corresponding to the above given Formula II, such as:

2-methyl-4-fluoro phenoxy acetic acid,
2-methyl-4-chloro phenoxy acetic acid,
2-methyl-4-bromo phenoxy acetic acid,
2-methyl-6-chloro phenoxy acetic acid,
2-methyl-4,6-dichloro phenoxy acetic acid,
2,6-dichloro phenoxy acetic acid,
3,5-dibromo phenoxy acetic acid,
   pentachloro phenoxy acetic acid,
2,3,4-tribromo phenoxy acetic acid,
2,3,6-trichloro phenoxy acetic acid,
4-bromo-2-chloro phenoxy acetic acid,
4-fluoro phenoxy acetic acid,
4-chloro phenoxy acetic acid,
2-iodo-4-chloro-phenoxy acetic acid,
α-(2,4-dichloro phenoxy) propionic acid,
α-(2,3,5-trichloro phenoxy) propionic acid,
α-(2,4-dichloro phenoxy) butyric acid,
α-(2,4,5-trichloro phenoxy) butyric acid and others.

The halogenides of said other halogenated phenoxy acetic acids, and espectially their acid chlorides and bromides, can also be used as one esterification component.

In place of lactic acid ethyl ester and glycolic acid butyl ester used as the other esterification component in Examples I to III, there can be employed equimolecular amounts of other α-hydroxy carboxylic acid compounds of Formula III, such as:

Lactic acid methyl ester,
Lactic acid butyl ester,
Lactic acid amyl ester,
Lactic acid octyl ester,
Lactic acid methoxy ethyl ester,
Lactic acid ethoxy ethyl ester,
Lactic acid butoxy ethyl ester,
Lactic acid butoxy ethoxy propyl ester,
Lactic acid dipropylene glycol monobutyl ether ester,
Lactic acid triethylene glycol monoethyl ether ester,
Lactic acid triethylene glycol monoester,
Glycolic acid ethyl ester,
Glycolic acid propyl ester,
Glycolic acid amyl ester,
Glycolic acid propoxy ethyl ester,
Glycolic acid ethylene glycol monoester,
Glycolic acid diethylene glycol monoester,
Glycolic acid diethylene glycol monobutyl ether ester,
Glycolic acid propylene glycol monobutyl ether ester,
Glycolic acid propylene glycol monoester,
α-hydroxy butyric acid butyl ester,
α-hydroxy butyric acid triethylene glycol monoester, and others.

Likewise, in place of the disodium salt of lactic acid used in Example IV, there can be employed equimolecular amounts of the disodium salts of glycolic acid or α-hydroxy butyric acid or of other di-alkali metal salts of said α-hydroxy carboxylic acids or of the monosodium salts or mono-alkali metal salts of the α-hydroxy carboxylic acid esters mentioned hereinabove.

When using the above mentioned reaction components in place of the reaction components given in Examples I to IV, the procedure is essentially the same as that described in said examples and the reaction products, which are non-distillable oils, are also obtained in high yields of about 90%.

The new low-volatile herbicidal esters of halogenated phenoxy acetic acids are not only applied in the form of aqueous emulsions or suspensions. They can also be used in solution, for instance, in diesel oil, kerosene, xylene, or other aromatic herbicide oils.

As stated above, the new esters of halogenated phenoxy acetic acids of the above given Formula I have a more prolonged herbicidal activity than the heretofore used esters of halogenated phenoxy acetic acids. For instance, when applying an aqueous 0.2% emulsion of 2,4-dichloro phenoxy acetyl lactic acid ethyl ester and an aqueous 0.2% emulsion of 2,4-dichloro phenoxy acetic acid butyl ester, both compounds in amounts of 1500 gm. per hectare, for the control of perennial weeds, the herbicidal effect of the new ester persists for 25–30 days while that of the known ester is observed only for 15–20 days.

In brush control by means of the new esters, higher concentrations of the herbicidal ingredients are applied. Good results are obtained by applying, for instance, aqueous emulsions containing between 1.0% and 3.0% of the new esters in amounts of 80 liters to 100 liters per hectare.

Of course, many changes and variations in the reactants used for ester formation, in the esterification conditions, temperature, duration, in the solvents employed, the esterification catalysts added, in the methods of working up and purifying the new esters, in the formulation of herbicidal preparations, the emulsifiers, wetting agents, solid carriers, solvents used in said preparations, and the like, may be made by those skilled in the art in accordance with the principles set forth herein and in the claims annexed hereto.

We claim:

1. 2,4,5-trichloro phenoxy acetyl lactic acid ethyl ester.
2. 2,4,5-trichloro phenoxy acetyl glycolic acid butyl ester.
3. 2,4-dichloro phenoxy acetyl lactic acid ethyl ester.
4. 2,4,5-trichloro phenoxy acetyl lactic acid.
5. 2,4,5-trichloro phenoxy acetyl lactic acid amyl ester.
6. A 2,4,5-trichloro phenoxy acetyl lactic acid alkyl ester with 1 to 8 carbon atoms in the alkyl radical.
7. A 2,4-dichloro phenoxy acetyl lactic acid alkyl ester with 1 to 8 carbon atoms in the alkyl radical.

8. Chlorinated phenoxyacetyl esters having the structural formula

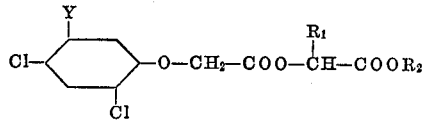

wherein Y is selected from the group consisting of hydrogen and chlorine, $R_1$ is selected from the group consisting of hydrogen and methyl and $R_2$ is selected from the group consisting of hydrogen and alkyl with 1 to 8 carbon atoms.

References Cited in the file of this patent

UNITED STATES PATENTS

| | | |
|---|---|---|
| 2,449,991 | Gresham et al. | Sept. 28, 1948 |
| 2,472,347 | Sexton | June 7, 1949 |
| 2,510,839 | Schmidl | June 6, 1950 |
| 2,543,397 | Allen | Feb. 27, 1951 |

OTHER REFERENCES

Mitchell et al.: Science, 120, 263 to 265 (Aug. 13, 1954).